United States Patent
Chae et al.

(10) Patent No.: US 9,152,260 B2
(45) Date of Patent: Oct. 6, 2015

(54) TOUCH PANEL AND FABRICATING METHOD THEREOF

(71) Applicant: SAMSUNG ELECTRO-MECHANICS CO., LTD., Suwon (KR)

(72) Inventors: Kyoung Soo Chae, Suwon (KR); Jung Ryoul Yim, Suwon (KR); Jang Ho Park, Suwon (KR); Nam Keun Oh, Suwon (KR); Yun Ki Hong, Suwon (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 152 days.

(21) Appl. No.: 13/831,815

(22) Filed: Mar. 15, 2013

(65) Prior Publication Data
US 2014/0176821 A1    Jun. 26, 2014

(30) Foreign Application Priority Data

Dec. 20, 2012  (KR) .......................... 10-2012-0149402

(51) Int. Cl.
*G06F 3/041*    (2006.01)
(52) U.S. Cl.
CPC ..................... *G06F 3/041* (2013.01)

(58) Field of Classification Search
CPC combination set(s) only.
See application file for complete search history.

(56) References Cited

U.S. PATENT DOCUMENTS

| | | | | |
|---|---|---|---|---|
| 2009/0236151 A1* | 9/2009 | Yeh et al. | .................... | 178/18.03 |
| 2009/0242283 A1* | 10/2009 | Chiu | .......................... | 178/20.01 |
| 2011/0169783 A1* | 7/2011 | Wang et al. | .................... | 345/176 |
| 2011/0279401 A1* | 11/2011 | Hong et al. | .................... | 345/174 |
| 2011/0304578 A1* | 12/2011 | Kim et al. | ..................... | 345/174 |
| 2012/0268418 A1 | 10/2012 | Ishizaki et al. | | |

* cited by examiner

*Primary Examiner* — Kumar Patel
*Assistant Examiner* — Amy C Onyekaba
(74) *Attorney, Agent, or Firm* — McDermott Will & Emery LLP (57) ABSTRACT

Disclosed herein are a touch panel and a fabricating method thereof. In the touch panel according to an embodiment of the present invention, a noise shielding layer may be separately formed between a transparent substrate and an electrode pattern, thereby shielding noise that occur from a display coupled to the touch panel. In addition, through a bridge electrode pattern formed by patterning the noise shielding layer and a bridge insulating pattern patterned on an insulating layer formed on the noise shielding layer, a first electrode pattern and a second electrode pattern may be formed on the same plane of the transparent substrate so as to intersect with each other, thereby ensuring reliability of electrical connection between each electrode pattern.

9 Claims, 7 Drawing Sheets

TOUCH PANEL AND FABRICATING METHOD THEREOF

CROSS REFERENCE TO RELATED APPLICATION

This application claims the benefit of Korean Patent Application No. 10-2012-0149402, filed on Dec. 20, 2012, entitled "Touch Panel and Fabricating Method of the Same", which is hereby incorporated by reference in its entirety into this application.

TECHNICAL FIELD

The present invention relates to a touch panel and a fabricating method thereof.

DESCRIPTION OF THE RELATED ART

With the development of computers using digital technology, computer assisted devices have been accordingly developed, and a personal computer, a portable transmission device, and other private information processing devices may perform a text and graphic process using a variety of input devices such as a keyboard or a mouse.

However, as applications of the computer have been increasingly widened with the rapid progress in information society, there is a problem in effectively driving a product only using a keyboard and a mouse presently serving as an input device. Accordingly, there is a high demand for a device having a simple configuration and less erroneous operation, and capable of easily inputting information by anyone.

In addition, concerns of technology for the input device have changed to high-reliability, durability, innovation, design and processing related technology, and the like beyond the level of satisfying general functions, and for this, a touch panel has been developed as an input device capable of inputting information such as text, graphics, and the like.

Such a touch panel may be provided on a display surface of a flat-panel display device such as an organizer, a liquid crystal display (LDC) device, a plasma display panel (PDP), an electroluminescence (EL), or the like, and on a display surface of a display such as a cathode ray tube (CRT), and be used to allow a user to select desired information while the user is looking at a display.

In addition, as types of touch panels, there are a resistive type, a capacitive type, an electro-magnetic type, a surface acoustic wave (SAW) type, and an infrared type.

These various types of touch panels have been adopted in electronics in consideration of a problem of signal amplification, a difference in resolutions, difficulty of design and processing technology, optical characteristics, electrical characteristics, mechanical characteristics, environment-resistant characteristics, input characteristics, durability, and affordability, and a resistive film type touch panel and a capacitance type touch panel are currently used in the most extensive field.

Meanwhile, as disclosed in U.S. Patent Laid-Open Publication No. 2012 0268418 A1, in a case in which a touch panel and a display panel according to the related art are coupled to each other, there are a variety of problems that touch coordinates cannot be accurately recognized due to the occurrence of various noise when a user touches the touch panel caused by video signals or the like from a display, reliability of touch-driving is deteriorated, or the like.

PRIOR ART DOCUMENT

[Patent Document]
  (Patent Document 1) U.S. 2012 0268418 A1

SUMMARY OF THE INVENTION

The present invention has been made in an effort to provide a touch panel that may achieve operation performance of the touch panel and reliability of driving the touch panel by shielding various noise that occur from a display coupled to the touch panel by a noise shielding layer formed between a substrate of the touch panel and an electrode pattern thereof, and a fabricating method thereof.

According to an embodiment of the present invention, there is provided a touch panel including: a transparent substrate; a conductive noise shielding layer in which at least one bridge electrode pattern divided so as to be insulated is formed on the transparent substrate; an insulating layer that is formed on the noise shielding layer, and in which a bridge insulating pattern formed on the bridge electrode pattern so that both ends of the bridge electrode pattern are exposed is formed; first electrode patterns that are formed on the insulating layer and connected to each of both ends of the bridge electrode pattern to thereby be electrically connected to each other in one direction; and second electrode patterns that intersect with the first electrode patterns, and are formed on the insulating layer in one direction so as to be electrically connected to each other on the bridge insulating pattern.

Here, the bridge electrode pattern may be patterned on the noise shielding layer so as to be insulated.

In addition, the bridge insulating pattern may be patterned on the insulating layer so that the both ends of the bridge electrode pattern are exposed so as to be in contact with the first electrode pattern for electrical connection between the first electrode pattern.

In addition, the first electrode pattern and the second electrode pattern may be formed in a polygonal shape and formed in a mesh pattern.

In addition, the noise shielding layer may be made of the same material as the first electrode pattern and the second electrode pattern.

In addition, the bridge electrode pattern may be divided into at least one bridge electrode pattern so as to be electrically insulated on the noise shielding layer, and be formed on an area where the first electrode pattern and the second electrode pattern intersect with each other.

In addition, the bridge insulating pattern may be formed on the bridge electrode pattern, and be formed so as to insulate, from the bridge electrode pattern, electrical connection of any one electrode pattern of the first electrode pattern and the second electrode pattern which is not connected to the bridge electrode pattern.

According to another embodiment of the present invention, there is provided a fabricating method of a touch panel, including: preparing a transparent substrate; forming, on the transparent substrate, a noise shielding layer with a bridge electrode pattern formed thereon; forming, on the noise shielding layer, an insulating layer in which a pattern portion corresponding to the bridge electrode pattern is exposed, and in which a bridge insulating pattern connected in one direction so that only both ends of the bridge electrode pattern are exposed on the exposed pattern portion is formed; forming, on the insulating layer, first electrode patterns connected to each of both ends of the bridge electrode pattern to thereby be electrically connected to each other; and forming, on the bridge insulating pattern formed on the bridge electrode pattern, second electrode patterns that intersect with the first electrode patterns so as to be electrically connected to each other.

Here, the bridge electrode pattern may be patterned on the noise shielding layer so as to be insulated.

In addition, the first electrode pattern and the second electrode pattern may be formed in a polygonal shape and formed in a mesh pattern.

In addition, the noise shielding layer may be made of the same material as the first electrode pattern and the second electrode pattern.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

The objects, features, and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted.

Further, in the following description, the terms "first", "second", "one side", "the other side", and the like are used to differentiate a certain component from other components, but the configuration of such components should not be construed to be limited by the terms.

Hereinafter, preferred embodiments of the present invention will be described in detail with reference to the attached drawings.

Figure 1:
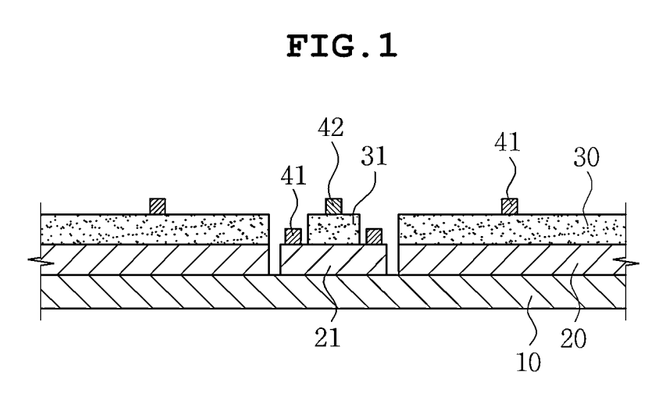
FIG. 1 is a cross-sectional view of a touch panel according to an embodiment of the present invention.

FIG. 1 is a cross-sectional view of a touch panel according to an embodiment of the present invention.

As shown in FIG. 1, the touch panel according to an embodiment of the present invention may include a transparent substrate 10, a conductive noise shielding layer 20 in which at least one bridge electrode pattern 21 divided so as to be insulated is formed on the transparent substrate 10, an insulating layer 30 that is formed on the noise shielding layer 20, and in which a bridge insulating pattern 31 formed on the bridge electrode pattern 21 so that both ends of the bridge electrode pattern 21 are exposed is formed, first electrode patterns 41 that are formed on the insulating layer 30, and electrically connected to each of the both ends of the bridge electrode pattern 21 in one direction, and second electrode patterns 42 that intersect with the first electrode patterns 41, and are formed on the insulating layer 30 in one direction so as to be electrically connected to each other on the bridge insulating pattern 31.

The transparent substrate 10 is not particularly limited as long as it has more than a predetermined strength, but it is preferable that the transparent substrate 10 be made of polyethylene terephthalate (PET), polycarbonate (PC), poly methyl methacrylate (PMMA), polyethylene naphthalate (PEN), polyethersulfone (PES), a cyclic olefin polymer (COC), triacetylcellulose (TAC) film, a polyvinyl alcohol (PVA) film, a polyimide (PI) film, polystyrene (PS), K resin-containing biaxially oriented PS (BOPS), glass, tempered glass, or the like. In addition, since a transparent electrode may be formed on one surface of the transparent substrate 10, a high-frequency process or a primer process may be performed on one surface of the transparent substrate 10 in order to improve adhesion between the transparent substrate 10 and the transparent electrode, thereby forming a surface treated layer.

The noise shielding layer 20 may be formed on the transparent substrate 10, and made of a conductive material. The noise shielding layer 20 may be disposed between the transparent substrate 10 and an electrode pattern 40 which will be described later, and therefore various types of noise occurring from a display disposed below the touch panel may be shielded, thereby further improving electrical reliability. The noise shielding layer 20 may be made of the same as or different from the electrode pattern 40 which will be described below, and being made of the same material as the electrode pattern 40 may be more suitable in terms of visibility of the touch panel. The bridge electrode pattern 21 for electrical connection of the electrode pattern 40 may be formed on the noise shielding layer 20 as an independent pattern that is electrically insulated.

Figure 2:
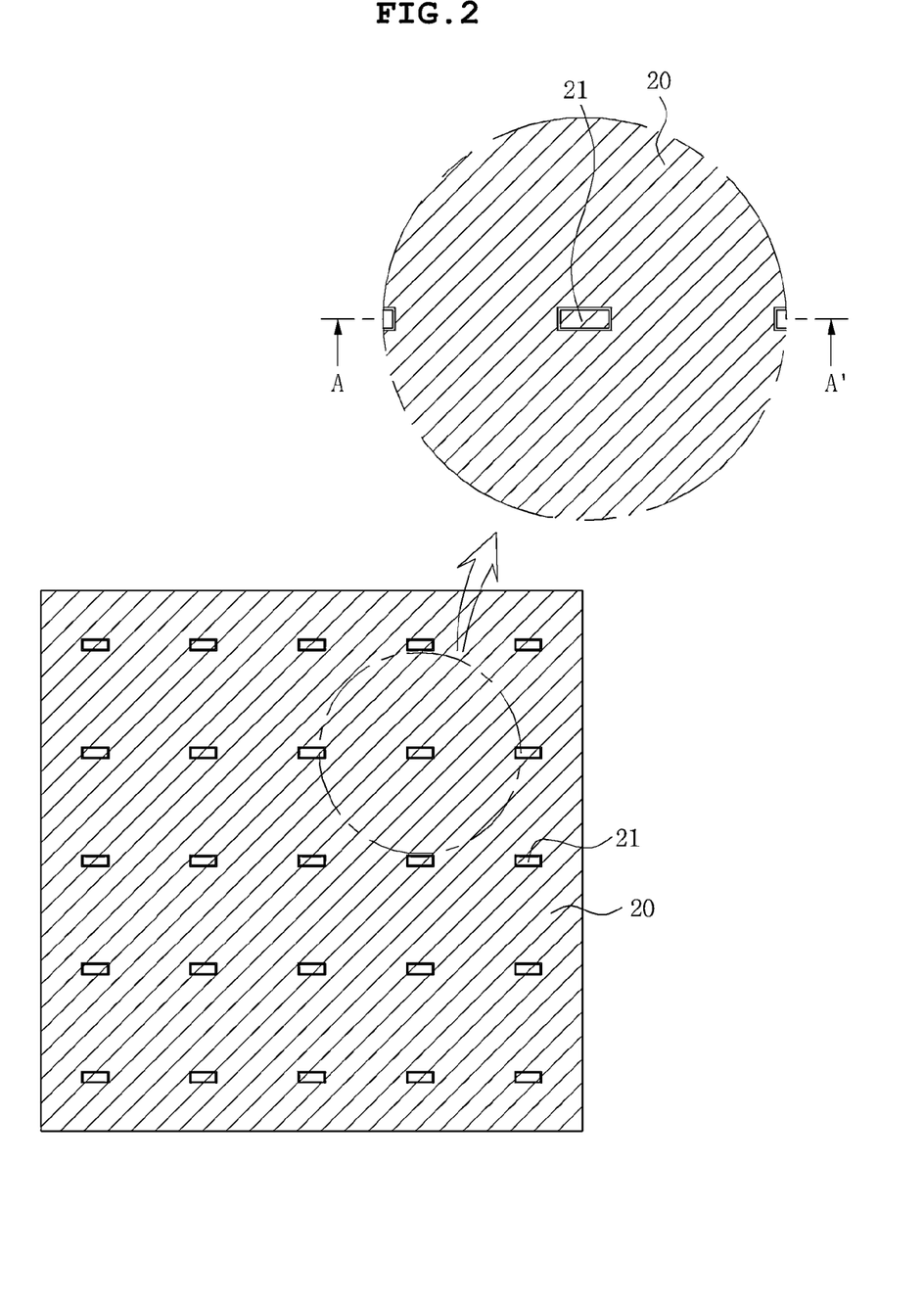
FIGS. 2 and 3 are respectively a plan view and a cross-sectional view of a touch panel showing a process of forming a noise shielding layer as a fabricating method of a touch panel according to an embodiment of the present invention.

As shown in FIG. 2, the bridge electrode pattern 21 may be divided into at least one bridge electrode pattern 21 formed in a predetermined pattern shape so as to be independently insulated on the noise shielding layer 20. The bridge electrode pattern 21 is used for electrically connecting the electrode pattern 40 in one direction in which any one of the first electrode pattern 41 and the second electrode pattern 42, which will be described below, is formed. When the first electrode pattern 41 and the second electrode pattern 42 are formed so as to intersect with each other, an electrical connection may be performed in one direction in which any one electrode pattern 40 of the first electrode pattern 41 and the second electrode pattern 42 is formed.

In FIG. 2, the bridge electrode pattern 21 may be patterned so as to be insulated by being surrounded with a predetermined separation space, but other than such an insulation method, a variety of methods may be applied. In the drawing, the bridge electrode pattern 21 may be formed for electrical connection in an area intersecting with the first electrode pattern 41 in one direction in which the first electrode pattern 41 is formed, and therefore the second electrode pattern 42 may be electrically connected on the bridge insulating pattern 31. Obviously, such electrical connection of the first electrode pattern and the second electrode pattern may be substituted with each other.

The insulating layer 30 may be formed on the noise shielding layer 20. When the electrode pattern 40 made of a foreign material or the same material is stacked on the noise shielding layer 20 thereafter, the insulating layer 30 may prevent a reduction in adhesion with the electrode pattern 40. In addition, by forming the bridge insulating pattern 31 on the insulating layer 30, the first electrode pattern 41 and the second electrode pattern 42 may be formed so as to intersect with each other on the same plane of the transparent substrate 10. A material capable of forming the insulating layer 30 is an insulating material, and it is preferable that the insulating layer 30 be formed of a transparent insulating composition for ensuring visibility of the touch panel. However, in a case in which the insulating layer 30 is formed in a mesh type pattern like the electrode pattern 40, which will be described below, the insulating layer 30 may be formed in a mesh structure even though an opaque material is used.

Figure 4:
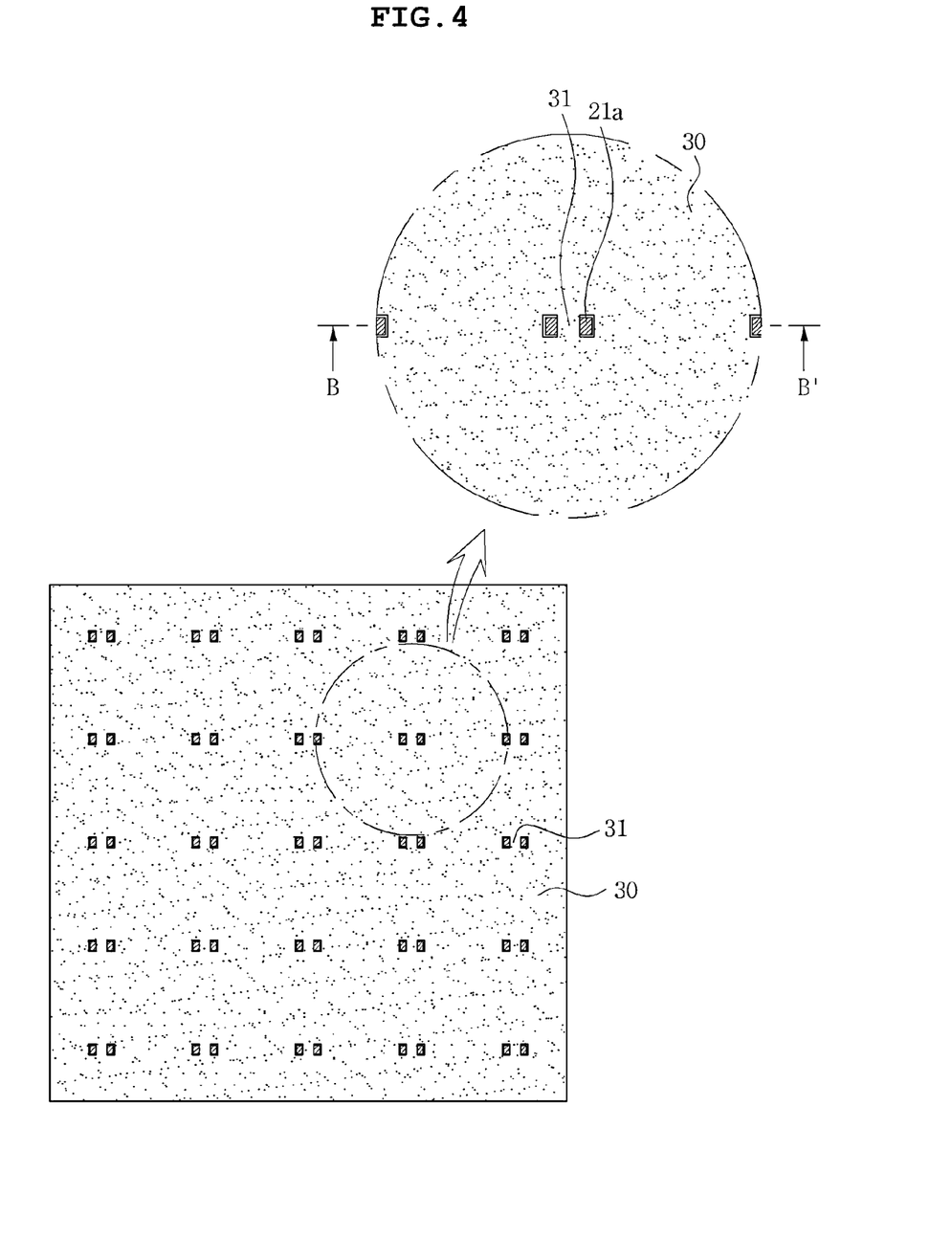
FIGS. 4 and 5 are respectively a plan view and a cross-sectional view of a touch panel showing a process of forming an insulating layer on a noise shielding layer as a fabricating method of a touch panel according to an embodiment of the present invention.

The bridge insulating pattern 31 may be formed on the insulating layer 30. The bridge insulating pattern 31 may be patterned while the insulating layer 30 is formed. When the first electrode pattern 41 is electrically connected to both ends of the bridge electrode pattern 21 in an area where the first electrode pattern 41 and the second electrode pattern 42 intersect with each other, the bridge insulating pattern 31 is connected between contact portions 21*a* of both ends of the bridge electrode pattern 21 in a formation direction of the second electrode pattern, and therefore the second electrode pattern 42 may be electrically connected on the bridge insulating pattern 31. Therefore, when the first electrode pattern 41 and the second electrode pattern 42 are formed on the same plane of a transparent substrate, insulation and electrical connection in the area where the first electrode pattern 41 and the second electrode pattern 42 intersect with each other may be simultaneously achieved. As an example, as shown in FIG. 4, the bridge electrode pattern 21 is patterned on the insulating layer 30 so as to be connected in one direction in which the second electrode pattern 42 is formed, except for the contact portions 21*a* of both ends for electrically connecting the first electrode pattern 41, and therefore the second electrode pattern 42 is electrically connected on the bridge insulating pattern 31.

The first electrode pattern 41 and the second electrode pattern 42 may be formed so as to intersect with each other. That is, when the first electrode pattern 41 is a pattern in an X-axis direction, the second electrode pattern 42 may be formed as a pattern in a Y-axis direction. The first electrode pattern 41 and the second electrode pattern 42 may generate signals at the time of user's touch to thereby allow a controller to recognize touch coordinates. Here, the electrode pattern 40 may be formed in a mesh pattern using copper (Cu), aluminum (Al), gold (Au), silver (Ag), titanium (Ti), palladium (Pd), chromium (Cr), or a combination thereof. In this instance, the electrode pattern 40 may be formed by a deposition process using a plating process or a sputter. Meanwhile, when the electrode pattern 40 is made of copper (Cu), a surface of the electrode pattern 40 is subjected to a black-oxidation treatment. Here, the black-oxidation treatment is to deposit $Cu_2O$ or CuO by oxidizing the surface of the electrode pattern 40. Here, $Cu_2O$ is referred to as a brown oxide due to its brown color, and CuO is referred to as a black oxide due to its black color. In this manner, the surface of the electrode pattern 40 is subjected to the black-oxidation treatment, and therefore light may be prevented from being reflected, thereby improving visibility of the touch panel.

Meanwhile, other than the above-described metal, the electrode pattern 40 may use a metal formed by exposing and developing a silver salt emulsion layer, and it may be apparent to those of skilled in the art that various types of materials capable of forming the mesh pattern may be selected as a conductive metal.

Meanwhile, the electrode pattern 40 is formed in a bar-shaped pattern as shown in the drawing, but is not limited thereto. That is, the electrode pattern 40 may be formed in a pattern known in the art such as a rhombic pattern, a square pattern, a triangular pattern, a circular pattern, or the like.

Figure 7:
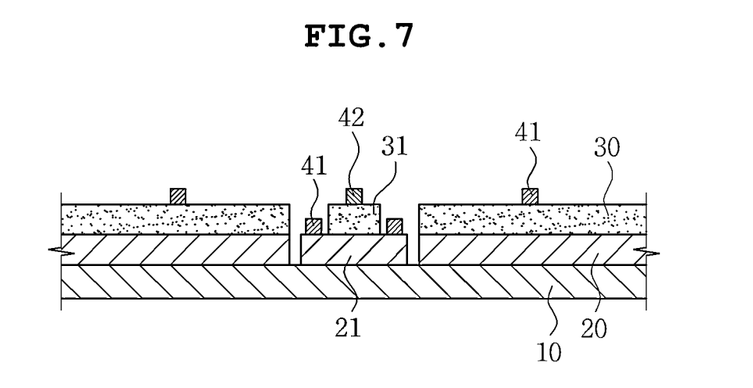

In particular, according to an embodiment of the present invention, as shown in FIG. 7, by forming the first electrode pattern 41 and the second electrode pattern 42 on the same plane of the transparent substrate 10, the electrode pattern 40 may be formed in a polygonal pattern such as a rhombic pattern or the like.

Figure 3:
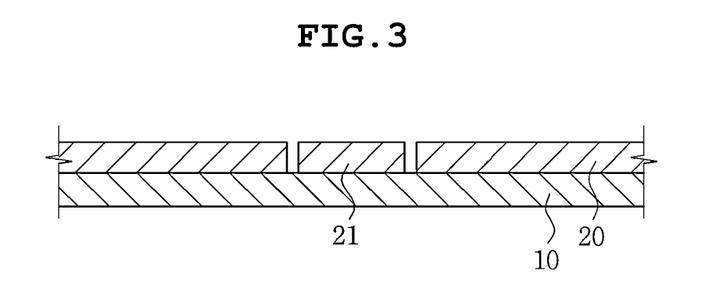
Figure 5:
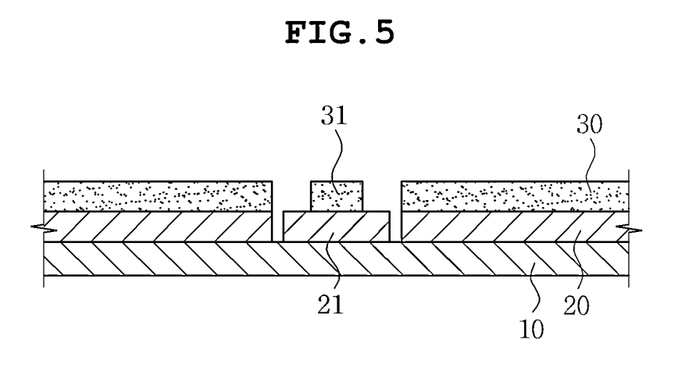
Figure 6:
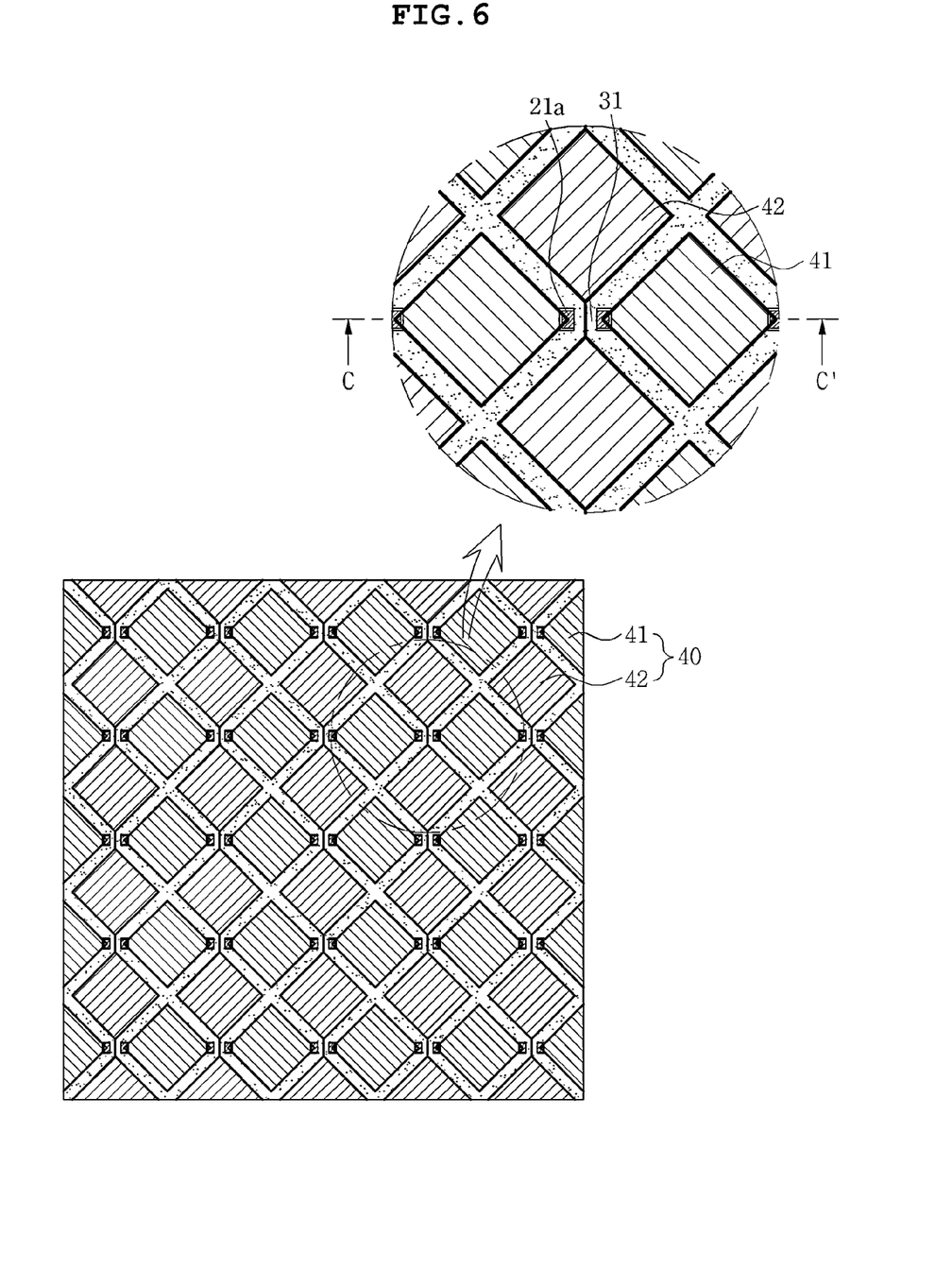
FIGS. 6 and 7 are respectively a plan view and a cross-sectional view of a touch panel showing a process of forming an electrode pattern on an insulating layer as a fabricating method of a touch panel according to an embodiment of the present invention.

FIGS. 2 and 3 are respectively a plan view and a cross-sectional view showing a process of forming a noise shielding layer 20 as a fabricating method of a touch panel according to an embodiment of the present invention, FIGS. 4 and 5 are respectively a plan view and a cross-sectional view of a touch panel showing a process of forming an insulating layer 30 on a noise shielding layer 20 as a fabricating method of a touch panel according to an embodiment of the present invention, and FIGS. 6 and 7 are respectively a plan view and a cross-sectional view of a touch panel showing a process of forming an electrode pattern 40 on an insulating layer 30 as a fabricating method of a touch panel according to an embodiment of the present invention.

The fabricating method of the touch panel according to an embodiment of the present invention may include preparing a transparent substrate 10, forming, on the transparent substrate 10, a noise shielding layer 20 with a bridge electrode pattern 21 formed thereon, forming, on the noise shielding layer 20, an insulating layer 30 in which a pattern portion corresponding to the bridge electrode pattern 21 is exposed, and in which a bridge insulating pattern 31 connected in one direction so that only both ends of the bridge electrode pattern 21 are exposed on the exposed pattern portion is formed, forming, on the insulating layer 30, a first electrode pattern 41 connected to both ends of the bridge electrode pattern 21 so as to be electrically connected to each other, and forming, on the bridge insulating pattern 31 formed on the bridge electrode pattern 21, a second electrode pattern 42 which intersects with the first electrode pattern 41 so as to be electrically connected to each other.

As shown in FIGS. 2 and 3, first, the noise shielding layer 20 in which the bridge electrode pattern 21 is formed on the prepared transparent substrate 10 may be formed. The noise shielding layer 20 may be formed on the transparent substrate 10, and made of a conductive material. In addition, the noise shielding layer 20 is disposed between the transparent substrate 10 and the electrode pattern 40, thereby shielding various types of noise from occurring on a display disposed below the touch panel. As shown in FIG. 2, the bridge electrode pattern 21 may be divided so as to be insulated on the noise shielding layer 20, and patterned. Such a bridge electrode pattern 21 may be formed together with the bridge insulating pattern 31 thereafter, and therefore electrical connection between each electrode pattern 40 in an intersection area of the first electrode pattern 41 and the second electrode pattern 42 may be made possible.

Next, as shown in FIGS. 4 and 5, the insulating layer 30 may be formed on the noise shielding layer 20. The insulating layer 30 may be patterned so that the bridge insulating pattern 31 is formed, and formed on the noise shielding layer 20. Here, the bridge insulating pattern 31 may be formed on the bridge electrode pattern 21, and the first electrode pattern 41 to be connected to the bridge electrode pattern 21 may be formed across a center portion of the bridge electrode pattern 21 so as to intersect with a direction of both ends which are brought into contact with each other. Consequently, the bridge insulating pattern 31 is used for allowing the second electrode pattern 42 and the bridge electrode pattern 21 to be electrically connected with each other on the bridge insulating pattern 31 while the second electrode pattern 42, which will be described below, is insulated from the bridge electrode pattern 21.

Next, as shown in FIGS. 6 and 7, the first electrode pattern 41 and the second electrode pattern 42 are formed in a direction in which the first electrode pattern 41 and the second electrode pattern 42 intersect with each other. The first electrode pattern 41 may be formed on the insulating layer 30, and connected to each of the contact portions 21a at both ends of the bridge electrode pattern 21, and therefore electrical connection between the first electrode pattern 41 may be achieved in one direction in which the first electrode pattern 41 is formed. As described above, the bridge insulating pattern 31 is formed on the bridge electrode pattern 21, and at the same time, electrical connection between the first electrode pattern 41 may be achieved in directions of both ends of the bridge electrode pattern 21.

The second electrode pattern 42 may be formed so as to vertically intersect with the first electrode pattern 41. The second electrode pattern 42 is formed so as to intersect with the first electrode pattern 41 on the same plane, and therefore insulation of the intersecting area of the first and second electrode patterns 41 and 42 may become an important issue. Therefore, the bridge insulating pattern 31 may be formed on the bridge electrode pattern 21 that is the area where the first and second electrode patterns 41 and 42 intersect with each other, in a direction in which the second electrode pattern 42 is formed. The first electrode pattern 41 may be insulated from the bridge electrode pattern 21 while being electrically connected to the bridge electrode pattern 21, and may be formed so as to be electrically connected to the second electrode pattern 42 on the bridge insulating pattern 31 that extends in a direction in which the second electrode pattern 42 is formed. Consequently, the first electrode pattern 41 and the second electrode pattern 42 are formed together on one surface of the transparent substrate 10 so as to intersect with each other, and therefore the touch panel may be made thinner, and operation performance of the touch panel and reliability of driving may be improved.

Here, the first electrode pattern 41 and the second electrode pattern 42 are arbitrarily separated, and the electrode pattern 40 electrically connected to the bridge electrode pattern 21 or the bridge insulating pattern 31 may be arbitrarily selected or applied.

Repeated descriptions of other respective components corresponding to those of the touch panel according to an embodiment of the present invention will be omitted.

As described above, according to the embodiments of the present invention, the noise shielding layer may be formed between the transparent substrate and the electrode pattern, and therefore noise occurring from a display coupled to the touch panel may be shielded, thereby improving operation performance of the touch panel and reliability of driving.

In addition, a plurality of bridge electrode patterns which are divided so as to be insulated may be formed on the noise shielding layer formed on the transparent substrate, and therefore electrical connection of any one electrode pattern in an intersecting area of the first and second electrode patterns formed on the transparent substrate may be achieved, thereby improving electrical reliability of the first and second electrode patterns formed on the same plane of a single transparent substrate.

In addition, the insulating layer may be formed on the noise shielding layer, the bridge insulating pattern for connecting between both ends where the bridge electrode pattern is electrically connected with the electrode pattern may be formed, and another electrode pattern intersecting with the electrode pattern connected to the bridge electrode pattern may be electrically connected on the bridge insulating pattern, and therefore reliability of forming the electrode pattern of the touch panel may be improved.

In addition, the noise shielding layer for improving electrical reliability of the first and second electrode patterns intersecting with each other on the same plane of the transparent substrate and shielding noise that occur from a display coupled to the touch panel may be formed, and therefore usability and productivity of the fabricating method of the touch panel in addition to structural reliability of the touch panel may be further improved.

Although the embodiments of the present invention have been disclosed for illustrative purposes, it will be appreciated that the present invention is not limited thereto, and those skilled in the art will appreciate that various modifications, additions, and substitutions are possible, without departing from the scope and spirit of the invention.

Accordingly, any and all modifications, variations, or equivalent arrangements should be considered to be within the scope of the invention, and the detailed scope of the invention will be disclosed by the accompanying claims.

What is claimed is:

1. A touch panel comprising:
a transparent substrate;
a conductive noise shielding layer in which at least one bridge electrode pattern divided so as to be insulated is formed on the transparent substrate;
an insulating layer that is formed on the noise shielding layer, and in which a bridge insulating pattern formed on the bridge electrode pattern so that both ends of the bridge electrode pattern are exposed is formed;
first electrode patterns that are formed on the insulating layer and connected to each of both ends of the bridge electrode pattern to thereby be electrically connected to each other in one direction; and
second electrode patterns that intersect with the first electrode patterns, and are formed on the insulating layer in one direction so as to be electrically connected to each other on the bridge insulating pattern,
wherein the bridge electrode pattern is patterned in the noise shielding layer so as to be insulated, and
wherein the bridge electrode pattern and the noise shielding layer are formed directly on the transparent substrate.

2. The touch panel as set forth in claim 1, wherein the bridge insulating pattern is patterned on the insulating layer so that both ends of the bridge electrode pattern are exposed so as to be in contact with the first electrode pattern for electrical connection between the first electrode pattern.

3. The touch panel as set forth in claim 1, wherein the first electrode pattern and the second electrode pattern are formed in a polygonal shape and formed in a mesh pattern.

4. The touch panel as set forth in claim 1, wherein the noise shielding layer is made of the same material as the first electrode pattern and the second electrode pattern.

5. The touch panel as set forth in claim 1, wherein the bridge electrode pattern is divided into at least one bridge electrode pattern so as to be electrically insulated on the noise shielding layer, and is formed on an area where the first electrode pattern and the second electrode pattern intersect with each other.

6. The touch panel as set forth in claim 5, wherein the bridge insulating pattern is formed on the bridge electrode pattern, and is formed so as to insulate, from the bridge electrode pattern, electrical connection of any one electrode pattern of the first electrode pattern and the second electrode pattern which is not connected to the bridge electrode pattern.

7. A fabricating method of a touch panel, comprising:
preparing a transparent substrate;
forming, on the transparent substrate, a noise shielding layer with a bridge electrode pattern formed thereon;
forming, on the noise shielding layer, an insulating layer in which a pattern portion corresponding to the bridge electrode pattern is exposed, and in which a bridge insulating pattern connected in one direction so that only both ends of the bridge electrode pattern are exposed on the exposed pattern portion is formed;
forming, on the insulating layer, first electrode patterns connected to each of both ends of the bridge electrode pattern to thereby be electrically connected to each other; and
forming, on the bridge insulating pattern formed on the bridge electrode pattern, second electrode patterns that intersect with the first electrode patterns so as to be electrically connected to each other,
wherein the bridge electrode pattern is patterned in the noise shielding layer so as to be insulated, and
wherein the bridge electrode pattern and the noise shielding layer are formed directly on the transparent substrate.

8. The fabricating method as set forth in claim 7, wherein the first electrode pattern and the second electrode pattern are formed in a polygonal shape and formed in a mesh pattern.

9. The fabricating method as set forth in claim 7, wherein the noise shielding layer is made of the same material as the first electrode pattern and the second electrode pattern.

* * * * *